(12) United States Patent
Bennighof

(10) Patent No.: US 7,188,039 B2
(45) Date of Patent: Mar. 6, 2007

(54) DAMPED FREQUENCY RESPONSE APPARATUS, SYSTEMS, AND METHODS

(75) Inventor: Jeffrey K. Bennighof, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 11/088,154

(22) Filed: Mar. 23, 2005

(65) Prior Publication Data

US 2005/0171742 A1 Aug. 4, 2005

Related U.S. Application Data

(63) Continuation of application No. PCT/US03/30150, filed on Sep. 23, 2003.

(60) Provisional application No. 60/412,895, filed on Sep. 23, 2002.

(51) Int. Cl.
*G06F 17/16* (2006.01)
(52) U.S. Cl. ............................. 702/75; 702/56; 702/41; 73/579

(58) Field of Classification Search ................. 702/75, 702/76, 56, 33–36, 39, 41–43, 103, 106, 702/109, 112, 113, 183, 189, 196; 73/583, 73/570, 579, 581, 582, 588, 602, 786, 802, 73/804; 700/275, 280; 708/802, 311
See application file for complete search history.

(56) References Cited

U.S. PATENT DOCUMENTS

| 5,233,540 | A | | 8/1993 | Andersson et al. ......... 700/280 |
| 5,686,667 | A | * | 11/1997 | McCollum et al. ........... 73/579 |
| 5,777,236 | A | * | 7/1998 | Walls ........................... 73/786 |
| 6,779,404 | B1 | * | 8/2004 | Brincker et al. .............. 73/659 |

* cited by examiner

*Primary Examiner*—Hal Wachsman
(74) *Attorney, Agent, or Firm*—Schwegman, Lundberg, Woessner & Kluth, P.A.

(57) ABSTRACT

Apparatus, systems, and methods are disclosed to solve an equation associated with a structure of the form $\{-\omega^2 M_R + i\omega B_R + [(1+i\gamma)K_R + i(K_{4R})]\}Y = F_R$, wherein $\omega$ is a time-harmonic excitation frequency, $M_R$ is a reduced form of a symmetric mass matrix M, $B_R$ is a reduced form of a viscous damping matrix B, $\gamma$ is a scalar global structural damping coefficient, $K_R$ is a reduced form of a symmetric stiffness matrix K, $K_{4R}$ is a reduced form of a symmetric structural damping matrix $K_4$ representing local departures from $\gamma$, $F_R$ is a reduced form of a matrix F, and Y is a matrix having a plurality of vectors corresponding to the plurality of load vectors acting on the structure and included in the matrix F.

47 Claims, 2 Drawing Sheets

DAMPED FREQUENCY RESPONSE APPARATUS, SYSTEMS, AND METHODS

CROSS REFERENCE TO RELATED APPLICATIONS

This application is a continuation application under 35 U.S.C. 111(a) of PCT/US03/30150, filed Sep. 23, 2003, which claims priority benefit of U.S. Provisional Application No. 60/412,895, filed Sep. 23, 2002, which applications are incorporated herein by reference.

TECHNICAL FIELD

Various embodiments relate generally to apparatus, systems, and methods for vibration analysis of various structures, including vehicles.

BACKGROUND

Using nomenclature that is well known to those of ordinary skill in the art of industrial vibration analysis, the frequency response problem for damped structures discretized by the finite element method can be defined by Equation (1), having the general form:

$$\{-\omega^2 M + i\omega B + [(1+i\gamma)K + i(K_4)]\}X = F. \quad (1)$$

Here $\omega$ is the radian frequency of the time-harmonic excitation and response, and $i=\sqrt{(-1)}$. M is the mass matrix, which may be symmetric. B is the viscous damping matrix, which may be nonsymmetric if gyroscopic effects are modeled. It is important to note that if the structures being modeled are automobiles, the matrix B may be of very low rank (e.g., less than about 50, including zero) because B's rank is substantially equal to the number of viscous damping elements, which can include shock absorbers and engine mounts. If gyroscopic effects are modeled, the rank of B is not ordinarily greatly increased.

The scalar $\gamma$ is a global structural damping coefficient. K is the symmetric stiffness matrix. $K_4$ is a structural damping matrix that may be symmetric and represents local departures from the global structural damping level represented by $\gamma$.

X is a matrix of displacement vectors to be determined in the frequency response analysis. Each vector in X represents a response of the structure to the corresponding load vector in the matrix F. The matrices M, B, K and $K_4$ may be real-valued and sparse, with millions of rows and columns. The response matrix X can be dense and complex-valued, although only a small number of rows in X, associated with specific degrees of freedom for the structure, may be of interest.

In automotive applications, the frequency response problem can be solved at hundreds of frequencies to obtain frequency response functions over a broad frequency range. Direct or iterative solutions at each frequency, using a different coefficient matrix, is not usually feasible. The practical approach, therefore, has been to approximate the solution using the subspace of undamped natural modes of vibration having natural frequencies lower than a specified cutoff frequency. Because the number of modes m is usually much smaller than the dimension of the original frequency response problem in Equation (1), the solution of the problem typically becomes more economical.

These modes are obtained as a partial eigensolution of the generalized eigenvalue problem $K\Phi=M\Phi\Lambda$, in which $\Phi$ is a rectangular matrix whose columns may be eigenvectors, and $\Lambda$ is a diagonal matrix containing real-valued eigenvalues, which may be squares of natural frequencies. With mass normalization, so that $\Phi^T M\Phi=I$, where I is the identity matrix, $\Phi$ and $\Lambda$ satisfy $\Phi^T K\Phi=\Lambda$. By making the approximation $X \approx \Phi Y$ and pre-multiplying the frequency response problem of Equation (1) by $\Phi^T$, the modal frequency response problem, which is of dimension m, may be obtained in Equation (2) as:

$$\{-\omega^2 I + i\omega(\Phi^T B\Phi) + [(1+i\gamma)\Lambda + i(\Phi^T K_4\Phi)]\}Y = \Phi^T F. \quad (2)$$

The accuracy of this modal approximation may be adequate for certain purposes if the cutoff frequency is chosen appropriately.

The number of modes m represented in $\Phi$ can be in the thousands, which may reduce the dimension of the original frequency response problem of Equation (1) to that of the modal frequency response problem of Equation (2). When B and $K_4$ are not present, the solution of the modal frequency response problem can be less costly since the coefficient matrix might be diagonal. However, when B and $K_4$ are nonzero, the matrices $\Phi^T B\Phi$ and $\Phi^T K_4\Phi$ may each be of dimension m×m and fully populated, such that solving the modal frequency response problem becomes considerably more expensive.

This is because, at every frequency, a complex dense square matrix having a dimension in the thousands may have to be factored. The cost of factorization may be proportional to the cube of the matrix dimension, which can be equal to the number of eigenvectors in $\Phi$. As the upper frequency limit for the analysis increases, so does the cutoff frequency for the modes represented in $\Phi$, so the number of modes m may increase markedly. Therefore, the expense of the modal frequency response analysis can increase rapidly as the upper frequency limit for the analysis increases. Until recently, frequency response analysis in industry has generally been limited to low frequencies, lessening this concern, mostly because of the cost of the $K\Phi=M\Phi\Lambda$ eigensolution.

Another approach to the solution of the modal frequency response problem is to diagonalize the coefficient matrix by solving an eigenvalue problem. Because the coefficient matrix may be quadratic in frequency, a state-space formulation might be used, in which the unknowns include velocities in addition to displacements. However, this may result in doubling the dimension of the eigenvalue problem, possibly increasing the cost of the eigensolution by a factor of eight. Complex arithmetic and asymmetry can also add to the cost.

Making use of such an eigensolution approach might be more economical in some cases than the approach of factoring the complex dense coefficient matrix in Equation (2) at each frequency, but the difference in cost has not been enough to motivate implementing the eigensolution approach in most industrial structural analysis software. Thus, there is a need for apparatus, systems, articles, and methods for more efficiently determining the frequency response characteristics of damped structures, including vehicles, such as automobiles, aircraft, ships, submarines, and spacecraft.

DETAILED DESCRIPTION

Figure 1:
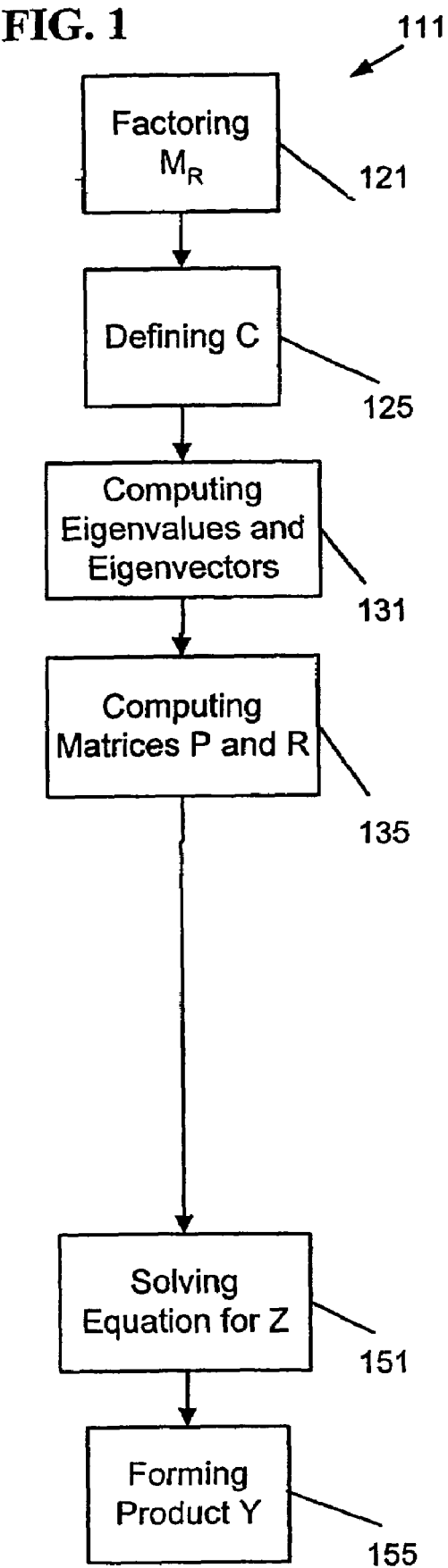
FIG. 1 is a flow diagram of a method according to various embodiments.

To simplify the following discussion, some basic definitions and notation will be introduced, as follows:

$M_R$: is a reduced form of a symmetric mass matrix M. However, for simpler problems, $M_R$ may also be treated as an original mass matrix.

$B_R$: is a reduced form of a viscous damping matrix B. However, for simpler problems, $B_R$ may also be treated as an original viscous damping matrix.

$K_R$: is a reduced form of a symmetric stiffness matrix K. However, for simpler problems, $K_R$ may also be treated as an original stiffness matrix.

$\gamma$: is a scalar structural damping parameter.

$K_{4R}$: is a reduced form of a symmetric structural damping matrix $K_4$, which represents local departure from the level of structural damping represented by $\gamma$. However, for simpler problems, $K_{4R}$ may also be treated as an original structural damping matrix.

$F_R$: is a reduced form of a matrix F including a plurality of load vectors acting on a structure. Loading may be mechanical, in the conventional sense, as well as acoustic, fluidic, or otherwise. In the case of a "structural acoustic" or "fluid-structure interaction" problem, an acoustic or fluid pressure loading may have to be determined in the solution process. It is customary to arrange the equations so that the unknown loading terms are on the left-hand side of the equations with the unknown structural response, but we note that these loading terms can equivalently be moved to the right-hand side of the equations that govern the structural response, and included in the matrix F. Any type of force that can be applied to a damped structure can be considered a "load" herein, and characterized by one or more load vectors included in the matrix F. Thus, the load vectors may be actual, simulated, or a combination of these.

i: is the "imaginary unit," satisfying $i=\sqrt{-1}$.

Considering again Equation (2), a complex symmetric m×m matrix C may be defined as $C=(1+i\gamma)\Lambda+i(\Phi^T K_4 \Phi)$. The eigenvalue problem may then be stated as $C\Phi_C=\Phi_C\Lambda_C$, for which the two square matrices $\Phi_C$ and diagonal $\Lambda_C$ may be complex-valued. $\Phi_C$ can be normalized to satisfy $\Phi_C^T\Phi_C=I$, in which case $\Phi_C^T C\Phi_C=\Lambda_C$. For the frequency response problem of Equation (2), the matrix Y may be defined as $Y=\Phi_C Z$ for an arbitrary matrix Y because $\Phi_C$ may be square and nonsingular. Equation (2) may then be premultiplied by $\Phi_C^T$ to obtain Equation (3):

$$\{-\omega^2 I + i\omega(\Phi_C^T B \Phi \Phi_C) + \Lambda_C\} Z = \Phi_C^T \Phi^T F. \tag{3}$$

Matrix B may have a low rank (e.g., less than about 50, including zero), be real-valued and have a singular value decomposition $B=U\Sigma V^T$. Here U and V may have r columns, where r=rank(B), and $\Sigma$ may be of dimension r×r and diagonal, containing the nonzero singular values of B. For the case in which B is symmetric, for example, representing viscous damping effects, U=V may contain the eigenvectors of B corresponding to nonzero eigenvalues of B which appear in $\Sigma$. Using a singular value decomposition of matrix B, Equation (3) can be transformed to become:

$$(D(\omega)+PQ(\omega)R)Z=\Phi_C^T\Phi^T F. \tag{4}$$

As a matter of convenience, it is possible to define a series of matrices, such as an m×m diagonal matrix $D(\omega)=-\omega^2 I + \Lambda_C$, an m×r matrix $P=\Phi_C^T \Phi^T U$, an r×r diagonal matrix $Q(\omega)=i\omega\Sigma$, and an r×m matrix $R=V^T\Phi\Phi_C$, wherein U and V are matrices which may satisfy a singular value decomposition $B=U\Sigma V^T$, and wherein $\Sigma$ may be a diagonal matrix including singular values. The frequency response problem in Equation (4) may then be set forth as:

$$\{D(\omega)+PQ(\omega)R\}Z=\Phi_C^T\Phi^T F. \tag{5}$$

The coefficient matrix (D+PQR) may be referred to as a "diagonal plus low rank" (DPLR) matrix, the modified frequency response problem (Equation (5)) may be referred to as the DPLR problem, and the solution matrix Z may be referred to as the DPLR solution. The inverse of the DPLR matrix is given by Equation (6):

$$(D+PQR)^{-1}=D^{-1}-D^{-1}PQ^{1/2}(I+Q^{1/2}RD^{-1}PQ^{1/2})^{-1}Q^{1/2}RD^{-1}. \tag{6}$$

If matrix B is symmetric, matrix R may be equal to $P^T$. In this case, the inverse of the DPLR matrix may be transformed to become Equation (7):

$$(D+PQP^T)^{-1}=D^{-1}-D^{-1}PQ^{1/2}(I+Q^{1/2}P^T D^{-1}PQ^{1/2})^{-1}(D^{-1}PQ^{1/2})^T. \tag{7}$$

Those of ordinary skill in the art, after reading this disclosure, will realize that there are other equivalent ways of expressing the inverse of the DPLR matrix.

Since matrix B may be of low rank, solving Equation (5) for Z may be very economical. One method of solving Equation (5) may be to multiply the right-hand side matrix $\Phi_C^T\Phi^T F$ by the inverse of the DPLR matrix, quite possibly forming the product in stages. Alternatively, an iterative scheme could be used. For example, the DPLR problem (Equation (5)) can be multiplied by $D^{-1}$ to obtain a modified DPLR problem, set forth in Equation (8):

$$\{I+D^{-1}PQR\}Z=D^{-1}\Phi_C^T\Phi^T F. \tag{8}$$

An initial approximate solution for Equation (8) might be: $Z_0=D^{-1}\Phi_C^T\Phi^T F$. The residual of Equation (8) can be computed and used to form the first block of a block Krylov subspace. The second block of the block Krylov subspace may be obtained by multiplying the first block by $D^{-1}PQR$, the third is obtained by multiplying the second block of the block Krylov subspace by $D^{-1}PQR$, and so on. If the initial approximate solution is corrected by minimizing the norm of the residual of the modified DPLR problem (Equation (8)) over the block Krylov subspace, convergence to the exact DPLR solution may occur in r iterations. Once Z is obtained, determining X and Y is straightforward.

If the matrix $K_4$, in Equation (1) is of relatively low rank (e.g., rank less than about 2000, including zero), forming the matrix C and solving the eigenvalue problem $C\Phi_C=\Phi_C\Lambda_C$ may become unnecessary. If singular value decompositions of B and $K_4$ are represented as $B=U_B\Sigma_B V_B^T$ and $K_4=U_{K4}\Sigma_{K4}V_{K4}^T$, respectively, the modal frequency response problem of Equation (2) can be written in the form of Equation (9):

$$\left\{-\omega^2 I + (1+i\gamma)\Lambda + \Phi^T[U_B U_{K4}]\begin{bmatrix} i\omega\Sigma_B & 0 \\ 0 & i\Sigma_{K4} \end{bmatrix}\begin{bmatrix} V_B^T \\ V_{K4}^T \end{bmatrix}\Phi\right\}Y = \Phi^T F \tag{9}$$

This is in the same form as Equation (5), with $D(\omega)=-\omega^2 I + (1+i\gamma)\Lambda$, $P=\Phi^T[U_B U_{K4}]$, $Q(\omega)=$block-diag $(i\omega\Sigma_B, i\Sigma_{K4})$, and $R=(\Phi^T[U_B U_{K4}])^T$. Z has been replaced by Y, and the right-hand side of Equation (9) has become $\Phi^T F$. This form of the DPLR problem can be solved as described above.

In some instances, forming a reduced frequency response problem by using a reduced subspace does not result in diagonal reduced mass and stiffness matrices (e.g., I and $\Lambda$ in Equation (2)). This can occur if design modifications result in changes to the finite element mass and stiffness matrices, or if the columns of the matrix Φ, which define the reduced subspace, are not eigenvectors of the eigenvalue problem $K\Phi=M\Phi\Lambda$. However, the frequency response approach presented here can still be used. In the case of design modifications which result in matrices M+ΔM (e.g., where ΔM is a change in the mass matrix, B+ΔB, etc., in Equation (1), approximation of the response as $X \approx \Phi Y$ and pre-multiplying the frequency response problem of Equation (1) by $\Phi^T$, produces a reduced frequency response problem, in Equation (10) as:

$$\{-\omega^2 M + i\omega B + [(1+i\gamma)K + iK_4]\}Y = \Phi^T F. \quad (10)$$

in which the reduced matrices are:
$M=\Phi^T(M+\Delta M)\Phi$, $B=\Phi^T(B+\Delta B)\Phi$, $K=\Phi^T(K+\Delta K)\Phi$, and $K4=\Phi^T(K4+\Delta K4)\Phi$.

The reduced problem of Equation (10) can be solved by performing the factorization $M_R = L_M L_M^T$, wherein $L_M$ is a lower triangular matrix (note that other types of factorizations, such as one based on an eigenvalue decomposition of $M_R$, could also be used), representing Y as $Y = L_M^{-T}W$, and pre-multiplying Equation (10) by $L_M^{-1}$ to obtain:

$$\{-\omega^2 I + i\omega L_M^{-1} B L_M^{-T} + (1+i\gamma)L_M^{-1} K L_M^{-T} + iL_M^{-1} K_4 L_M^{-T}\}W = L_M^{-1}\Phi^T F. \quad (11)$$

An intermediate matrix C can then be defined as in Equation (12):

$$C = (1+i\gamma)L_M^{-1} K L_M^{-T} + iL_M^{-1} K_4 L_M^{-T}. \quad (12)$$

The eigenvalue problem $C\Phi_C = \Phi_C \Lambda_C$ is solved as described above, such that $\Phi_C^T \Phi_C = I$, and $\Phi_C^T C \Phi_C = \Lambda_C$. Representing W as $W = \Phi_C Z$, and pre-multiplying Equation (11) by $\Phi_C^T$ yields Equation (13):

$$\{-\omega^2 I + \Lambda_C + i\omega \Phi_C^T L_M^{-1} \Phi^T U \Sigma V^T \Phi L_M^{-T} \Phi_C\} Z = \Phi_C^T L_M^{-1} \Phi^T F. \quad (13)$$

in which the singular value decomposition $B+\Delta B = U\Sigma V^T$ has been used. Equation (13) can be written in the form of Equation (5), with D(ω) and Q(ω) as before, and $P = \Phi_C^T L_M^{-1} \Phi^T U$ and $R = V^T \Phi L_M^{-T} \Phi_C$. Then the right-hand side of Equation (13) is replaced with $\Phi_C^T L_M^{-1} \Phi^T F$, and the DPLR problem can be solved using the approach presented previously.

In summary, damped frequency response problems may be solved by accomplishing (a) some preparatory tasks prior to a sweep through the frequencies of interest, and then performing (b) other tasks at each frequency of interest. The preparatory tasks (a) can be stated as:

obtaining a matrix whose columns span the subspace used to approximate the frequency response (typically by solving a global undamped eigenvalue problem involving the finite element stiffness and mass matrices),
  computing a decomposition of a viscous damping matrix, and of the structural damping matrix if it is of low rank,
  computing the reduced mass, stiffness, structural damping (if it is not of low rank), and load matrices which appear in the modal or reduced frequency response problem,
  if the structural damping matrix is not of low rank, computing the eigenvalues and
eigenvectors of the matrix which is formed from the modal or reduced stiffness and
structural damping matrices, and
computing any other matrices needed for the frequency response calculations that do not vary with frequency.

The frequency sweep task (b) may comprise:
  at each frequency, solving the "diagonal plus low rank" (DPLR) frequency response problem for the DPLR solution by using a direct or an iterative method.

Building on the principles illustrated above, many embodiments may be realized. For example, FIG. 1 is a flow diagram illustrating a method according to various embodiments. The method 111 may be used to solve an equation associated with a structure, such as a building or an automobile, of the form $\{-\omega^2 M_R + i\omega B_R + [(1+i\gamma)K_R + i(K_{4R})]\}Y = F_R$. ω may be a time-harmonic excitation frequency, $M_R$ may be a reduced form of a symmetric mass matrix M, $B_R$ may be a reduced form of a viscous damping matrix B, and γ may be a scalar global structural damping coefficient. $K_R$ may be a reduced form of a symmetric stiffness matrix K, $K_{4R}$ may be a reduced form of a symmetric structural damping matrix $K_4$ representing local departures from γ, and $F_R$ may be a reduced form of a matrix F including a plurality of load vectors acting on the structure.

The method 111 may comprise factoring the reduced matrix $M_R = L_M L_M^T$, wherein $L_M$ is a lower triangular matrix (note that other types of factorizations, such as one based on an eigenvalue decomposition of $M_R$, could also be used) at block 121 and defining an intermediate matrix $C = (1+i\gamma)L_M^{-1} K_R L_M^{-T} + iL_M^{-1} K_{4R} L_M^{-T}$; at block 125. The method 111 may also include computing a plurality of eigenvalues and eigenvectors for a second equation $C\Phi_C = \Phi_C \Lambda_C$, wherein $\Phi_C$ includes eigenvectors of a matrix C and $\Phi_C$ is normalized so that $\Phi_C^T \Phi_C = I$, at block 131. I may be an identity matrix, and $\Lambda_C$ may be diagonal and include eigenvalues of the matrix C. Alternatively, the generalized eigenvalue problem $[(1+i\gamma)K_R + iK_{4R}]\Phi_G = M_R \Phi_G \Lambda_C$, wherein $\Phi_G = L_M^{-T} \Phi_C$, can be solved directly, without factoring the reduced matrix $M_R$.

The method 111 may further include computing a matrix $P = \Phi_C^T L_M^{-1} U_R$ and a matrix $R = V_R^T L_M^{-T} \Phi_C$, wherein $U_R$ and $V_R$ are matrices which may satisfy a singular value decomposition $B_R = U_R \Sigma_R V_R^T$, at block 135. $\Sigma_R$ may be diagonal, conformal with $U_R$ and $V_R$, and include singular values. The method 111 may also include solving an equation of the form $(D(\omega) + PQ(\omega)R)Z = \Phi_C^T L_M^{-1} F_R$ for Z at block 151 for each frequency of interest, wherein $D(\omega) = -\omega^2 I + \Lambda_C$ and $Q(\omega) = i\omega \Sigma_R$. The method may conclude at block 155 with forming a product $Y = L_M^{-T} \Phi_C Z$, wherein the product Y may be a matrix having a plurality of vectors corresponding to the plurality of load vectors (acting on the structure) included in the matrix F.

Many variations of the method 111 are possible. For example, the method 111 may include approximately solving an equation of the form $\{-\omega^2 M + i\omega B + [(1+i\gamma)K + iK_4]\}X = F$ by pre-multiplying the equation by a matrix $\Phi^T$ and solving for the matrix Y at block 155. The matrix X may be approximately equal to ΦY, and the matrix Φ may be a rectangular matrix having columns that span the approximating subspace. The method 111 may continue with computing the reduced matrices $M_R = \Phi^T M \Phi$, $B_R = \Phi^T B \Phi$, $K_R = \Phi^T K \Phi$, $K_{4R} = \Phi^T K_4 \Phi$, and $F_R = \Phi^T F$, and then forming an approximation $X \approx \Phi Y$ at block 155.

The method 111 may also include providing the matrix Φ, as well as providing or obtaining the matrices M, B, K, $K_4$, and F, and the scalar γ, which make take the form of experimental data. As noted previously, the method 111 may also comprise solving an equation of the form $(D(\omega)+PQ(\omega)R)Z=\Phi_C^T L_M^{-1} F_R$ for Z directly or iteratively, as well as repeatedly solving for Z for each one of a selected set of excitation frequencies including the excitation frequency $\omega$ at block 151.

Other variations of the method 111 are possible. For example, in the instance where matrices M and K are diagonalized by $\Phi$, the method 111 may be used for solving an equation, perhaps associated with a structure, of the form $\{-\omega^2 I_1+i\omega(\Phi^T B\Phi)+[(1+i\gamma)\Lambda+i(\Phi^T K_4\Phi)]\}Y=\Phi^T F$. $\omega$ may be a time-harmonic excitation frequency, $I_1$ may be an identity matrix which satisfies an equation of the form $\Phi^T M\Phi=I_1$, and M may be a symmetric mass matrix. $\Phi$ may be a matrix having a plurality of columns, each column including an eigenvector approximating one of a corresponding plurality of undamped natural modes of vibration associated with the structure, and B may be a viscous damping matrix. $\gamma$ may be a scalar representing a global structural damping coefficient, and $\Lambda$ may be a diagonal matrix which satisfies an equation of the form $\Phi^T K\Phi=\Lambda$, wherein K is a symmetric stiffness matrix. $K_4$ may be a symmetric structural damping matrix representing local departures from the global structural damping coefficient $\gamma$, and Y may be a matrix from which the approximation $X\approx\Phi Y$ is made, wherein X is a matrix having a plurality of displacement vectors to be determined and corresponding to a plurality of load vectors included in the matrix F.

In these circumstances, the method 111 may comprise defining an intermediate matrix $C=(1+i\gamma)\Lambda+i(\Phi^T K_4\Phi)$ at block 125 and computing a plurality of eigenvalues and eigenvectors for a third equation $C\Phi_C=\Phi_C\Lambda_C$, at block 131. $\Phi_C$ may include eigenvectors of the matrix C, such that $\Phi_C$ is normalized so that $\Phi_C^T\Phi_C=I_2$, a second identity matrix. $\Lambda_C$ may be a diagonal matrix containing eigenvalues of C.

The method 111 may also include computing a matrix $P=\Phi_C^T\Phi^T U$ and a matrix $R=V^T\Phi\Phi_C$ at block 135. U and V may be matrices which satisfy a singular value decomposition $B=U\Sigma V^T$, and $\Sigma$ may be a diagonal matrix including singular values. The method 111 may also include solving an equation of the form $\{D(\omega)+PQ(\omega)R\}Z=\Phi_C^T\Phi^T F$ for Z at block 151, wherein $D(\omega)=-\omega^2 I+\Lambda_C$ and $Q(\omega)=i\omega\Sigma$, and then computing $Y=\Phi_C^T Z$ at block 155.

In this case also, the method 111 provides approximation alternatives, such that the method 111 may include approximately solving an equation of the form $\{-\omega^2 M+i\omega B+[(1+i\gamma)K+iK_4]\}X=F$ by pre-multiplying the equation by $\Phi^T$ and solving for a matrix Y, wherein the matrix X is approximately equal to $\Phi Y$, wherein the matrix $\Phi$ is a matrix satisfying the equations $K\Phi=M\Phi\Lambda$, $\Phi^T M\Phi=I_3$, a third identity matrix, and $\Phi^T K\Phi=\Lambda$. The matrix $\Phi$ may include a plurality of columns, each column including an eigenvector that approximates one of a corresponding plurality of undamped natural modes of vibration associated with the structure. The matrix $\Lambda$ may be a diagonal matrix including a plurality of eigenvalues, each one of the plurality of eigenvalues corresponding to one of the eigenvectors or columns included in the matrix $\Phi$. The matrix Y may include a plurality of vectors corresponding to the plurality of load vectors included in the matrix F. And, as noted above, the method 111 may include forming an approximation $X\approx\Phi Y$.

In this case, the method 111 may also include computing the matrix $\Phi$, as well as providing the matrices M, B, K, $K_4$, and F, and the scalar $\gamma$, which may include the acquisition of experimental data with respect to the structure. In addition, the equation of the form $\{D(\omega)+PQ(\omega)R\}Z=\Phi_C^T\Phi^T F$ may be solved for Z directly, or iteratively, and include repeatedly solving for Z using each one of a selected set of excitation frequencies including the excitation frequency $\omega$.

Other variations of the method 111 are possible. For example, in the instance where matrices M and K are diagonalized by $\Phi$, a singular value decomposition of $B_R=\Phi^T B\Phi$ may be formed. In this case, the method 111 may be applied to solving an equation associated with a structure of the form $\{-\omega^2 I_1+i\omega(\Phi^T B\Phi)+[(1+i\gamma)\Lambda+i(\Phi^T K_4\Phi)]\}Y=\Phi^T F$. $\omega$ may be a time-harmonic excitation frequency, $I_1$ may be an identity matrix which satisfies an equation of the form $\Phi^T M\Phi=I_1$ (wherein M is a symmetric mass matrix), and $\Phi$ may be a matrix having a plurality of columns, each column including an eigenvector that approximates one of a corresponding plurality of undamped natural modes of vibration associated with the structure satisfying the eigenvalue problem $K\Phi=M\Phi\Lambda$. B may be a viscous damping matrix, $\gamma$ may be a scalar representing a global structural damping coefficient, and $\Lambda$ may be a diagonal matrix which satisfies an equation of the form $\Phi^T K\Phi=\Lambda$, wherein K is a symmetric stiffness matrix. $K_4$ may be a symmetric structural damping matrix representing local departures from the global structural damping coefficient $\gamma$, and Y may be a matrix from which the approximation $X\approx\Phi Y$ is made, wherein X is a matrix having a plurality of displacement vectors corresponding to a plurality of load vectors acting on the structure and included in the matrix F.

The method 111 in this case may include defining an intermediate matrix $C=(1+i\gamma)\Lambda+i(\Phi^T K_4\Phi)$ at block 125 and computing a plurality of eigenvalues and eigenvectors at block 131 for an equation of the form $C\Phi_C=\Phi_C\Lambda_C$, wherein $\Phi_C$ includes eigenvectors of the matrix C, and $\Phi_C$ is normalized so that $\Phi_C^T\Phi_C=I_2$, a second identity matrix. $\Lambda_C$ may be a diagonal matrix containing the eigenvalues of C.

The method 111 may also include computing a matrix $P=\Phi_C^T U_R$, and a matrix $R=V_R^T\Phi_C$ at block 135. $U_R$ and $V_R$ may be matrices that satisfy a singular value decomposition $\Phi^T B\Phi=U_R\Sigma_R V_R^T$, and $\Sigma_R$ may be a diagonal matrix including singular values. The method 111 may continue with solving an equation of the form $\{D(\omega)+PQ(\omega)R\}Z=\Phi_C^T\Phi^T F$ for Z at block 151, wherein $D(\omega)=-\omega^2 I+\Lambda_C$ and $Q(\omega)=i\omega\Sigma_R$, and then conclude at block 155 with computing $Y=\Phi_C^T Z$.

In this case also, the method 111 provides approximation alternatives, such that the method 111 may include approximately solving an equation of the form $\{-\omega^2 M+i\omega B+[(1+i\gamma)K+iK_4]\}X=F$ by pre-multiplying the equation by $\Phi^T$ and solving for a matrix Y, wherein the matrix X is approximately equal to $\Phi Y$. The matrix $\Phi$ may be a matrix satisfying the equations $K\Phi=M\Phi\Lambda$, $\Phi^T M\Phi=I_3$, a third identity matrix, and $\Phi^T K\Phi=\Lambda$, wherein the matrix $\Phi$ includes a plurality of columns, each column including an eigenvector that approximates one of a corresponding plurality of natural modes of vibration associated with the structure. The matrix Y may be a matrix having a plurality of vectors corresponding to the plurality of load vectors included in the matrix F. The method may then include forming an approximation $X=\Phi Y$ at block 155. As noted above, the method 111 may include computing the matrix $\Phi$, as well as providing the matrices M, B, K, $K_4$, and F, and the scalar $\gamma$, which may include acquiring various data associated with the structure. In addition, the method 111 may include solving an equation of the form $\{D(\omega)+PQ(\omega)R\}Z=\Phi_C^T\Phi^T F$ for Z directly or iteratively, as well as repeatedly solving for Z using each one of a selected set of excitation frequencies including the excitation frequency $\omega$.

Other variations of the method 111 are possible. For example, in the instance where matrix $K_4$ is of relatively low rank (e.g., the rank of matrix $K_4$ is less than about 2000, including zero), the method 111 may be applied to solving an equation associated with a structure of the form $\{-\omega^2 I_1 + i\omega(\Phi^T B\Phi) + [(1+i\gamma)\Lambda + i(\Phi^T K_4 \Phi)]\}Y = \Phi^T F$. $\omega$ may be a time-harmonic excitation frequency, $I_1$ may be an identity matrix which satisfies an equation of the form $\Phi^T M\Phi = I_1$, and M may be a symmetric mass matrix. $\Phi$ may be a matrix having columns spanning a subspace used to approximate a plurality of undamped natural modes of vibration associated with the structure, and B may be a viscous damping matrix. $\gamma$ may be a scalar representing a global structural damping coefficient, and $\Lambda$ may be a matrix that satisfies an equation of the form $\Phi^T K\Phi = \Lambda$, wherein K is a symmetric stiffness matrix. $K_4$ may be a symmetric structural damping matrix representing local departures from the global structural damping coefficient, and Y may be a matrix from which the approximation $X \approx \Phi Y$ is made, wherein X is a matrix having a plurality of displacement vectors corresponding to a plurality of load vectors applied to the structure and included in the matrix F.

In this case, the method 111 may comprise computing a singular value decomposition of at least one of the matrices B and $K_4$, wherein $B = U_B \Sigma_B V_B^T$, and wherein $K_4 = U_{K4} \Sigma_{K4} V_{K4}^T$; as part of computing matrices P and R at block 135, and then generating matrices $p = \Phi^T [U_B U_{K4}]$ and $R = (\Phi^T [V_B V_{K4}])^T$. In this case it can be seen that $D(\omega) = -\omega^2 I + (1+i\gamma)\Lambda$ and $Q(\omega) = $ block-diag ($i\omega\Sigma_B$, $i\Sigma_{K4}$) or:

$$Q = \begin{bmatrix} i\omega\Sigma_B & 0 \\ 0 & i\Sigma_{K4} \end{bmatrix}.$$

The method 111 may include solving an equation of the form $\{D(\omega) + PQ(\omega)R\}Y = \Phi^T F$ for Y.

In this case also, the method 111 provides approximation alternatives, such that the method 111 may include approximately solving an equation of the form $\{-\omega^2 M + i\omega B + [(1+i\gamma)K + iK_4]\}X = F$ by pre-multiplying the equation by $\Phi^T$ and solving for a matrix Y. Matrix X may be approximately equal to $\Phi Y$, and the matrix $\Phi$ may be a matrix satisfying the equations $K\Phi = M\Phi\Lambda$, $\Phi^T M\Phi = I_2$, a second identity matrix, and $\Phi^T K\Phi = \Lambda$, wherein the matrix $\Phi$ includes a plurality of columns, each column including an eigenvector approximating one of a corresponding plurality of natural modes of vibration associated with the structure. The matrix Y may be a matrix having a plurality of vectors corresponding to the plurality of load vectors included in the matrix F. The method 111 may then include forming an approximation $X \approx \Phi Y$ at block 155, as well as computing the matrix $\Phi$, as well as providing the matrices M, B, K, $K_4$, and F, and the scalar $\gamma$, to include acquiring data associated with the structure. An equation of the form $\{D(\omega) + PQ(\omega)R\}Y = \Phi^T F$ may be solved for Y directly, or iteratively, and the method 111 includes repeatedly solving for Y using each one of a selected set of excitation frequencies (including the excitation frequency $\omega$).

In this case also, the method 111 may also comprise computing a singular value decomposition for each one of the reduced matrices $B_R$ and $K_{4R}$, to solve an equation associated with a structure of the form $\{-\omega^2 I_1 + i\omega(\Phi^T B\Phi) + [(1+i\gamma)\Lambda + (\Phi^T K_4 \Phi)]\}Y = \Phi^T F$. Again, $\omega$ may be a time-harmonic excitation frequency, $I_1$ may be an identity matrix which satisfies an equation of the form $\Phi^T M\Phi = I_1$, and M may be a symmetric mass matrix, wherein $\Phi$ is a matrix having columns spanning a subspace used to approximate a plurality of undamped natural modes of vibration associated with the structure. The matrix B may be a viscous damping matrix, $\gamma$ may be a scalar representing a global structural damping coefficient, and $\Lambda$ may be a matrix which satisfies a second equation of the form $\Phi^T K\Phi = \Lambda$, wherein K is a symmetric stiffness matrix. Matrix $K_4$ may be a symmetric structural damping matrix representing local departures from the global structural damping coefficient, and Y may be a matrix from which the approximation $X \approx \Phi Y$ is made, wherein X may be a matrix having a plurality of displacement vectors corresponding to a plurality of load vectors included in the matrix F.

In this case, the method 111 may comprise computing a singular value decomposition for at least one of the matrices $B_R = \Phi_T B\Phi$ and $K_{4R} = \Phi^T K_4 \Phi$, wherein $B_R = U_{BR} \Sigma_{BR} V_{BR}^T$, and wherein $K_{4R} = U_{K4R} \Sigma_{K4R} V_{K4R}^T$, and then forming a matrix $P = [U_{BR} U_{K4R}]$ and a matrix $R = [V_{BR} V^{K4R}]^T$ at block 135. The method 111 may continue with solving an equation of the form $\{D(\omega) + PQ(\omega)R\}Y = \Phi^T F$ for Y, wherein $D(\omega) = -\omega^2 I + (1+i\gamma)\Lambda$ and $Q(\omega) = $ block-diag ($i\omega\Sigma_B$, $i\Sigma_{K4}$), as described previously.

In this case also, the method 111 provides approximation alternatives, such that the method 111 may include approximately solving an equation of the form $\{-\omega^2 M + i\omega B + [(1+i\gamma)K + iK_4]\}X = F$ by pre-multiplying the equation by $\Phi^T$ and solving for a matrix Y, wherein the matrix X is approximately equal to $\Phi Y$. The matrix $\Phi$ may be a matrix satisfying the equations $K\Phi = M\Phi\Lambda$, $\Phi^T M\Phi = I_2$, a second identity matrix, and $\Phi^T K\Phi = \Lambda$, wherein the matrix $\Phi$ includes a plurality of columns, each column including an eigenvector that approximates one of a corresponding plurality of natural modes of vibration associated with the structure. The matrix Y may be a matrix having a plurality of vectors corresponding to the plurality of load vectors included in the matrix F. In addition, the method may include forming an approximation $X \approx \Phi Y$ at block 155, as well as computing the matrix $\Phi$, and providing the matrices M, B, K, $K_4$, and F, and the scalar $\gamma$ (which may include the acquisition of data associated with the structure). The equation of the form $\{D(\omega) + PQ(\omega)R\}Y = \Phi^T F$ may be solved for Y directly, or iteratively, as well as repeatedly solving for Y using each one of a selected set of excitation frequencies including the excitation frequency $\omega$.

In summary, many variations of the illustrated embodiments may be realized. Immediately following are a few of the possible variations.

A method of solving a first equation of the form $\{-\omega^2 M_R + i\omega B_R + [(1+i\gamma)K_R + i(K_{4R})]\}Y = F_R$, and associated with a structure may be realized. $\omega$ may be a time-harmonic excitation frequency, $M_R$ may be a reduced form of a symmetric mass matrix M, $B_R$ may be a reduced form of a viscous damping matrix B, $\gamma$ may be a scalar global structural damping coefficient, $K_R$ may be a reduced form of a symmetric stiffness matrix K, $K_{4R}$ may be a reduced form of a symmetric structural damping matrix $K_4$ representing local departures from $\gamma$, and $F_R$ may be a reduced form of a matrix F including a plurality of load vectors acting on the structure. The method may comprise solving an eigenvalue problem of the form $[(1+i\gamma)K_R + iK_{4R}]\Phi_G = M_R \Phi_G \Lambda_G$; computing a matrix $P = \Phi_G^T U_R$ and a matrix $R = V_R^T \Phi_G$, wherein $U_R$ and $V_R$ are matrices which satisfy a singular value decomposition $B_R = U_R \Sigma_R V_R^T$, and wherein $\Sigma_R$ is diagonal, conformal with $U_R$ and $V_R$, and includes singular values; solving a third equation of the form $(D(\omega) + PQ(\omega)R) Z = \Phi_G^T F_R$ for Z, wherein $D(\omega) = -\omega^2 I + \Lambda_G$ and $Q(\omega) = i\omega\Sigma_R$, wherein $\Phi_G$ is normalized to satisfy $\Phi_G^T M_R \Phi_G = I$, where I is an identity matrix and $\Phi_G^T K_R \Phi_G = \Lambda_G$; and forming a product $Y=L_M^{-T}\Phi_G Z$, wherein the product Y is a matrix having a plurality of vectors corresponding to the plurality of load vectors included in the matrix F.

Another method of solving a first equation of the form $\{-\omega^2 M+i\omega B+[(1+i\gamma)K+i(K_4)]\}X=F$, and associated with a structure may be realized. Here X may be a matrix of displacement vectors, $\omega$ may be a time-harmonic excitation frequency, M may be a symmetric mass matrix, B may be a viscous damping matrix, $\gamma$ may be a scalar global structural damping coefficient, K may be a symmetric stiffness matrix, $K_4$ may be a symmetric structural damping matrix representing local departures from $\gamma$, F may be a matrix including a plurality of load vectors acting on the structure. In this case, the method may comprise transforming at least two matrices included in a set of matrices comprising M, B, K, $K_4$ to provide a set of at least two diagonalized matrices and a set of non-diagonalized matrices, wherein $K_4$ is non-null; forming a matrix D comprising a linear combination of the set of at least two diagonalized matrices; forming a matrix product PQR as a representation of a linear combination of the set of non-diagonalized matrices; solving a second equation of the form (D+PQR)Z=A for Z, wherein Z is a frequency response solution matrix, and wherein A is a transformed load matrix; and back-transforming the frequency response solution matrix Z to provide the matrix X. The matrices P and R can be rectangular, and the matrix Q can be square.

Yet another method of solving a first equation of the form $\{-\omega^2 M+i\omega B+[(1+i\gamma)K+i(K_4)]\}X=F$, and associated with a structure may be realized. Here X may be a matrix of displacement vectors, $\omega$ may be a time-harmonic excitation frequency, M may be a symmetric mass matrix, B may be a viscous damping matrix, $\gamma$ may be a scalar global structural damping coefficient, K may be a symmetric stiffness matrix, $K_4$ may be a symmetric structural damping matrix representing local departures from $\gamma$, F may be a matrix including a plurality of load vectors acting on the structure. In this case, the method may comprise forming a matrix D comprising a linear combination of a set of at least two diagonal matrices selected from the set of matrices M, B, K, $K_4$, wherein at least two of the matrices M, B, K, $K_4$ are diagonal, and wherein at least one of the matrices B and $K_4$ is non-null; forming a matrix product PQR as a representation of a linear combination of a set of non-diagonal matrices selected from the set of matrices M, B, K, $K_4$; and solving a second equation of the form (D+PQR)X=F for the matrix X. The matrices P and R can be rectangular, and the matrix Q can be square.

In another variation, a method of approximating a solution of a first equation associated with a structure, the first equation being of the form $\{-\omega^2 M+i\omega B+[(1+i\gamma)K+i(K_4)]\}X=F$, and associated with a structure may be realized. Here X may be a matrix of displacement vectors, $\omega$ may be a time-harmonic excitation frequency, M may be a symmetric mass matrix, B may be a viscous damping matrix, $\gamma$ may be a scalar global structural damping coefficient, K may be a symmetric stiffness matrix, $K_4$ may be a symmetric structural damping matrix representing local departures from $\gamma$, F may be a matrix including a plurality of load vectors acting on the structure. In this case, the method may comprise obtaining reduced forms of the matrices M, B, K, $K_4$, and F as $M_R=\Phi^T M\Phi$, $B_R=\Phi^T B\Phi$, $K_R=\Phi^T K\Phi$, $K_{4R}=\Phi^T K_4\Phi$, and $F_R=\Phi^T F\Phi$, respectively, wherein $\Phi$ is a matrix having columns spanning a subspace of approximation for approximating the solution matrix X, and wherein at least one of the matrices B and $K_4$ is non-null; forming a matrix D comprising a linear combination of a set of at least two diagonalized matrices selected from a set of matrices obtained from transforming the reduced matrices $M_R$, $B_R$, $K_R$, and $K_{4R}$; forming a matrix product PQR as a representation of a linear combination of the set of non-diagonalized matrices selected from a set of matrices obtained from transforming the reduced matrices $M_R$, $B_R$, $K_R$, and $K_{4R}$; solving a second equation of the form (D+PQR)Z=A for Z, wherein Z is a frequency response solution matrix, and wherein A is a transformed load matrix; and back-transforming the frequency response solution matrix Z to provide a back-transformed matrix Z and multiplying the back-transformed matrix Z by $\Phi$ to provide an approximation of the solution matrix X. The matrices P and R can be rectangular, and the matrix Q can be square.

Finally, in yet another variation, a method of approximating a solution of a first equation associated with a structure, the first equation being of the form $\{-\omega^2 M+i\omega B+[(1+i\gamma)K+i(K_4)]\}X=F$, and associated with a structure may be realized. Here X may be a matrix of displacement vectors, $\omega$ may be a time-harmonic excitation frequency, M may be a symmetric mass matrix, B may be a viscous damping matrix, $\gamma$ may be a scalar global structural damping coefficient, K may be a symmetric stiffness matrix, $K_4$ may be a symmetric structural damping matrix representing local departures from $\gamma$, F may be a matrix including a plurality of load vectors acting on the structure. In this case, the method may comprise obtaining reduced forms of the matrices M, B, K, $K_4$, and F as $M_R=\Phi^T M\Phi$, $B_R=\Phi^T B\Phi$, $K_R=\Phi^T K\Phi$, $K_{4R}=\Phi^T K_4\Phi$, and $F_R=\Phi^T F\Phi$, respectively, wherein $\Phi$ is a matrix having columns spanning a subspace of approximation for approximating the solution matrix X, wherein at least one of the matrices B and $K_4$ is non-null, and wherein at least two of the matrices selected from a set of reduced matrices including $M_R$, $B_R$, $K_R$, and $K_{4R}$ are diagonal; forming a matrix D comprising a linear combination of the at least two diagonal matrices selected from the set of reduced matrices including the matrices $M_R$, $B_R$, $K_R$, and $K_{4R}$; forming a matrix product PQR as a representation of a linear combination of the set of non-diagonal matrices selected from a set of reduced matrices including the matrices $M_R$, $B_R$, $K_R$, and $K_{4R}$; solving a second equation of the form $(D+PQR)Z=F_R$ for Z, wherein Z is a frequency response solution matrix; and multiplying the matrix Z by the matrix $\Phi$ to provide an approximation of the solution matrix X. Again, the matrices P and R can be rectangular, and the matrix Q can be square.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs may be structured in an object-oriented format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

Figure 2:
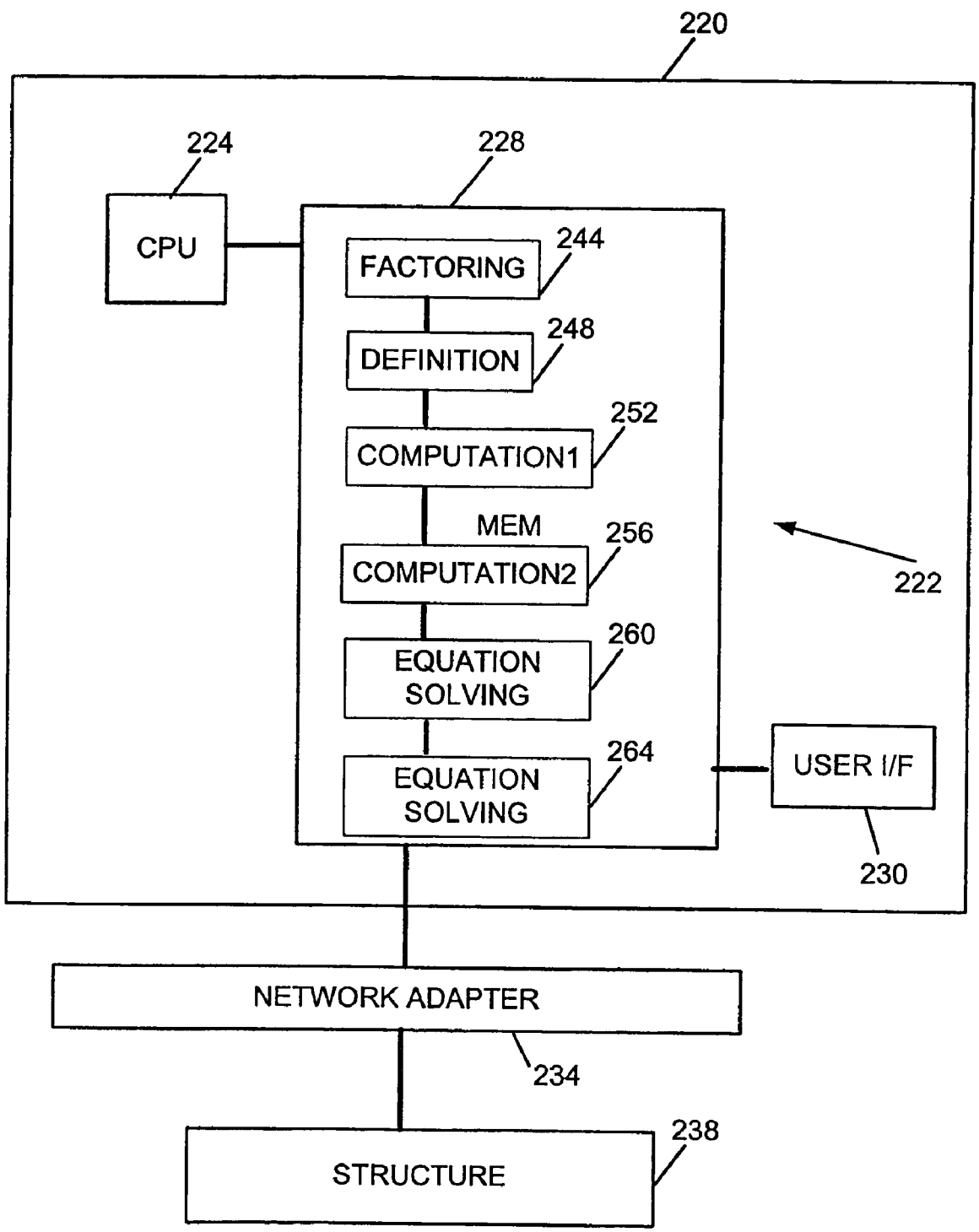
FIG. 2 illustrates an apparatus, system, and article according to various embodiments.

Thus, other embodiments may be realized. FIG. 2 illustrates an apparatus 222, system 220, and article 220 according to various embodiments. For example, an article 220 according to various embodiments, such as a computer, a memory system, a magnetic or optical disk, some other storage device, and/or any type of electronic device or system may comprise a machine-accessible medium 228 such as a memory (e.g., a memory including an electrical, optical, or electromagnetic conductor) having associated data 244, 248, 252, 256, 260, and 264 (e.g., computer program instructions), which when accessed, results in a machine 224 performing such actions as solving an equation associated with a structure. The equation may be of the form $\{-\omega^2 M_R + i\omega B_R + [(1+i\gamma)K_R + i(K_{4R})]\}Y = F_R$, wherein $\omega$ is a time-harmonic excitation frequency, $M_R$ is a reduced form of a symmetric mass matrix M, $B_R$ is a reduced form of a viscous damping matrix B, $\gamma$ is a scalar global structural damping coefficient, $K_R$ is a reduced form of a symmetric stiffness matrix K, $K_{4R}$ is a reduced form of a symmetric structural damping matrix $K_4$ representing local departures from $\gamma$, and $F_R$ is a reduced form of a matrix F including a plurality of load vectors. The data, when accessed, may result in a machine performing such actions as factoring the reduced matrix $M_R = L_M L_M^T$, wherein $L_M$ is a lower triangular matrix (note that other types of factorizations, such as one based on an eigenvalue decomposition of $M_R$, could also be used), defining an intermediate matrix $C = (1+i\gamma)L_M^{-1}K_R L_M^{-T} + iL_M^{-1}K_{4R}L_M^{-T}$, computing a plurality of eigenvalues and eigenvectors for a second equation $C\Phi_C = \Phi_C \Lambda_C$, wherein $\Phi_C$ includes eigenvectors of a matrix C and $\Phi_C$ is normalized so that $\Phi_C^T \Phi_C = I$ (I may be an identity matrix and $\Lambda_C$ may be diagonal and include eigenvalues of the matrix C). Alternatively, the generalized eigenvalue problem $[(1+i\gamma)K_R + iK_{4R}]\Phi_G = M_R \Phi_G \Lambda_C$, wherein $\Phi_G = L_M^{-T}\Phi_C$, can be solved directly, without factoring the reduced matrix $M_R$.

Other actions performed by the machine 224 may include computing a matrix $P = \Phi_C^T L_M^{-1} U_R$ and a matrix $R = V_R^T L_M^{-T}\Phi_C$, wherein $U_R$ and $V_R$ are matrices which satisfy a singular value decomposition $B_R = U_R \Sigma_R V_R^T$, and wherein $\Sigma_R$ is diagonal, conformal with $U_R$ and $V_R$, and includes singular values; and solving an equation of the form $(D(\omega) + PQ(\omega)R)Z = \Phi_C^T L_M^{-1} F_R$ for Z, wherein $D(\omega) = -\omega^2 I + \Lambda_C$ and $Q(\omega) = i\omega\Sigma_R$. Further actions performed by the machine 224 may include forming a product $Y = L_M^{-T}\Phi_C Z$, wherein the product Y is a matrix having a plurality of vectors corresponding to the plurality of load vectors included in the matrix F.

Still other embodiments may be realized. For example, some embodiments may include an apparatus to solve an equation associated with a structure. The equation may have the form $\{-\omega^2 M_R + i\omega B_R + [(1+i\gamma)K_R + i(K_{4R})]\}Y = F_R$, wherein $\omega$ is a time-harmonic excitation frequency, $M_R$ is a reduced form of a symmetric mass matrix M, $B_R$ is a reduced form of a viscous damping matrix B, and $\gamma$ is a scalar global structural damping coefficient. $K_R$ may be a reduced form of a symmetric stiffness matrix K, and $K_{4R}$ may be a reduced form of a symmetric structural damping matrix $K_4$ representing local departures from $\gamma$. $F_R$ may be a reduced form of a matrix F including a plurality of load vectors acting on the structure 238.

The apparatus 222 may comprise a factoring module 244 to factor the reduced matrix $M_R = L_M L_M^T$, wherein $L_M$ is a lower triangular matrix (note that other types of factorizations, such as one based on an eigenvalue decomposition of $M_R$, could also be used), and a definition module 248 capable of being communicatively coupled to the factoring module. The definition module 248 is to define an intermediate matrix $C = (1+i\gamma)L_M^{-1}K_R L_M^{-T} + iL_M^{-1}K_{4R}L_M^{-T}$.

The apparatus 222 may also include a first computation module 252 capable of being communicatively coupled to the definition module. The first computation module 252 is to compute a plurality of eigenvalues and eigenvectors for an equation of the form $C\Phi_C = \Phi_C \Lambda_C$, wherein $\Phi_C$ includes eigenvectors of a matrix C and $\Phi_C$ is normalized so that $\Phi_C^T \Phi_C = I$, wherein I is an identity matrix, and wherein $\Lambda_C$ is diagonal and includes eigenvalues of the matrix C (alternatively, the generalized eigenvalue problem $[(1+i\gamma)K_R + iK_{4R}]\Phi_G = M_R \Phi_G \Lambda_C$, wherein $\Phi_G = L_M^{-T}\Phi_C$, can be solved directly, without factoring the reduced matrix $M_R$). The apparatus 222 may also include a second computation module 256 capable of being communicatively coupled to the first computation module 252. The second computation module 256 is to compute a matrix $P = \Phi_C^T L_M^{-1} U_R$ and a matrix $R = V_R^T L_M^{-T}\Phi_C$, wherein $U_R$ and $V_R$ are matrices that may satisfy a singular value decomposition $B_R = U_R \Sigma_R V_R^T$. $\Sigma_R$ may be diagonal, conformal with $U_R$ and $V_R$, and includes singular values.

The apparatus 222 may include an equation solving module 260 capable of being communicatively coupled to the second computation module 256. The equation solving module 260 is to solve an equation of the form $(D(\omega) + PQ(\omega)R)Z = \Phi_C^T L_M^{-1} F_R$ for Z, wherein $D(\omega) = -\omega^2 I + \Lambda_C$ and $Q(\omega) = i\omega\Sigma_R$. The apparatus 222 may also include a product formation module 264 to form a product $Y = L_M^{-T}\Phi_C Z$, wherein the product Y may be a matrix having a plurality of vectors corresponding to the plurality of load vectors included in the matrix F.

A system 220 to solve an equation associated with a structure 238 is also included in some embodiments. The equation may be of the form $\{-\omega^2 M_R + i\omega B_R + [(1+i\gamma)K_R + i(K_{4R})]\}Y = F_R$, and include the variables described in conjunction with the apparatus 222. The system 220 may include a processor 224, as well as the apparatus 222 described above, perhaps comprising a memory 228 capable of being communicatively coupled to the processor. The apparatus 222, as described above, may include the modules 244, 248, 252, 256, 260, and 264. As part of the apparatus 222 and system 220 (e.g., a computer), a user interface (I/F) 230, perhaps comprising a keyboard, display, and graphical user interface, may be communicatively coupled to the machine 224 (e.g., comprising a CPU (central processing unit)), and/or the machine-accessible medium 224 (e.g., comprising a memory).

The apparatus 222 and system 220 have component elements which can all be characterized as "modules" herein. Such modules can include hardware, circuitry, and/or a microprocessor and/or memory circuits, software program modules, and/or firmware, and combinations thereof, as desired by the architect of the system and apparatus, and appropriate for particular embodiments.

The system 220 may comprise a computer, digital signal processor, or hybrid (digital/analog) computer. The system 220 may be coupled to a network adapter 234 and then to a structure 238, or directly to the structure 238 that is to be characterized (in terms of vibration) by the apparatus, articles, methods, and systems disclosed herein. Coupling may be electric, mechanical, fluid, thermodynamic, or a combination of these.

Implementing the apparatus, systems, and methods described herein may result in reducing the time required to solve equations of the general form $\{-\omega^2 I + i\omega(\Phi^T B\Phi) + [(1+i\gamma)\Lambda + i((\Phi^T K_4 \Phi)]\}Y = \Phi^T F$. Such equations may be associated with structures undergoing vibration analysis. If certain circumstances exist, for example, that matrix $K_4$ is of relatively low rank (e.g., matrix $K_4$ has a rank of less than about 2000, including zero), even greater savings may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of solving a first equation associated with a structure, the first equation being of the form $\{-\omega^2 M_R + i\omega B_R + [(1+i\gamma)K_R + i(K_{4R})]\}Y = F_R$, wherein $\omega$ is a time-harmonic excitation frequency, wherein $M_R$ is a reduced form of a symmetric mass matrix M, wherein $B_R$ is a reduced form of a viscous damping matrix B, wherein $\gamma$ is a scalar global structural damping coefficient, wherein $K_R$ is a reduced form of a symmetric stiffness matrix K, wherein $K_{4R}$ is a reduced form of a symmetric structural damping matrix $K_4$ representing local departures from $\gamma$, and wherein $F_R$ is a reduced form of a matrix F including a plurality of load vectors acting on the structure, the method comprising:

factoring the reduced matrix $M_R = L_M L_M^T$, wherein $L_M$ is a lower triangular matrix;

defining an intermediate matrix $C = (1+i\gamma)L_M^{-1}K_R L_M^{-T} + iL_M^{-1}K_{4R}L_M^{-T}$;

computing a plurality of eigenvalues and eigenvectors for a second equation $C\Phi_C = \Phi_C \Lambda_C$, wherein $\Phi_C$ is a matrix including eigenvectors of the matrix C, and wherein $\Lambda_C$ is a matrix including eigenvalues of the matrix C;

computing a matrix $P = \Phi_C^T L_M^{-1} U_R$ and a matrix $R = V_R^T L_M^{-T} \Phi_C$, wherein $U_R$ and $V_R$ are matrices which satisfy a singular value decomposition $B_R = U_R \Sigma_R V_R^T$, and wherein $\Sigma_R$ is diagonal, conformal with $U_R$ and $V_R$, and includes singular values;

solving a third equation of the form $(D(\omega) + PQ(\omega)R)Z = \Phi_C^T L_M^{-1} F_R$ for Z, wherein $D(\omega) = -\omega^2 \Phi_C^T \Phi_C + \Phi_C^T C \Phi_C$ and $Q(\omega) = i\omega \Sigma_R$;

forming a product $Y = L_M^{-T} \Phi_C Z$, wherein $\Phi$ comprises eigenvectors satisfying the eigenvalue problem $K\Phi = M\Phi\Lambda$, wherein $\Lambda = \Phi^T K\Phi$, and wherein a matrix $\Phi$ multiplied by the product Y is approximately equal to a matrix X including a plurality of displacements of the structure; and communicating an approximation of a vibration-induced displacement of the structure, including at least a portion of a product comprising the matrix $\Phi$ multiplied by the product Y, to a user interface.

2. The method of claim 1, further comprising:

approximately solving a fourth equation of the form $\{-\omega^2 M + i\omega B + [(1+i\gamma)K + iK_4]\}X = F$ by pre-multiplying the fourth equation by a matrix $\Phi^T$ and solving for the matrix Y, wherein the matrix X is approximately equal to $\Phi Y$, and wherein the matrix $\Phi$ is a rectangular matrix having columns that span the approximating subspace;

computing the reduced matrices $M_R = \Phi^T M\Phi$, $B_R = \Phi^T B\Phi$, $K_R = \Phi^T K\Phi$, $K_{4R} = \Phi^T K_4 \Phi$, and $F_R = \Phi^T F$; and forming an approximation $X \approx \Phi Y$.

3. The method of claim 2, further comprising:

providing the matrix $\Phi$.

4. The method of claim 3, further comprising:

providing the matrices M, B, K, $K_4$, and F, and the scalar $\gamma$.

5. The method of claim 1, further comprising:

solving the third equation of the form $(D(\omega) + PQ(\omega)R)Z = \Phi_C^T L_M^{-1} F_R$ for Z directly.

6. The method of claim 1, further comprising:

solving the third equation of the form $(D(\omega) + PQ(\omega)R)Z = \Phi_C^T L_M^{-1} F_R$ for Z iteratively.

7. The method of claim 1, further comprising:

repeatedly solving for Z for each one of a selected set of excitation frequencies including the excitation frequency $\omega$.

8. A method of solving a first equation associated with a structure, the first equation being of the form $\{-\omega^2 I_1 + i\omega(\Phi^T B\Phi) + [(1+i\gamma)\Lambda + i(\Phi^T K_4 \Phi)]\}Y = \Phi^T F$, wherein $\omega$ is a time-harmonic excitation frequency, wherein $I_1$ is an identity matrix which satisfies an equation of the form $\Phi^T M\Phi = I_1$, wherein M is a symmetric mass matrix, wherein $\Phi$ is a matrix having a plurality of columns, each column including an eigenvector approximating one of a corresponding plurality of undamped natural modes of vibration associated with the structure satisfying the eigenvalue problem $K\Phi = M\Phi\Lambda$, wherein B is a viscous damping matrix, wherein $\gamma$ is a scalar representing a global structural damping coefficient, wherein $\Lambda$ is a diagonal matrix which satisfies an equation of the form $\Phi^T K\Phi = \Lambda$, wherein K is a symmetric stiffness matrix, wherein $K_4$ is a symmetric structural damping matrix representing local departures from the global structural damping coefficient $\gamma$, wherein Y is a matrix from which an approximation in the form of a second equation $X \approx \Phi Y$ can be made, and wherein X is a matrix having a plurality of displacement vectors to be determined and corresponding to a plurality of load vectors acting on the structure included in the matrix F, the method comprising:

defining an intermediate matrix $C=(1+i\gamma)\Lambda+i(\Phi^T K_4 \Phi)$;

computing a plurality of eigenvalues and eigenvectors for a third equation $C\Phi_C=\Phi_C \Lambda_C$, wherein $\Phi_C$ is a matrix including eigenvectors of the matrix C, and wherein $\Lambda_C$ is a matrix including eigenvalues of the matrix C;

computing a matrix $P=\Phi_C^T \Phi^T U$, and a matrix $R=V^T \Phi \Phi_C$, wherein U and V are matrices which satisfy a singular value decomposition $B=U\Sigma V^T$, wherein $\Sigma$ is a diagonal matrix including singular values;

solving a fourth equation of the form $\{D(\omega)+PQ(\omega)R\}Z=\Phi_C^T \Phi^T F$ for Z, wherein $D(\omega)=-\omega^2 \Phi_C^T \Phi_C + \Phi_C^T C \Phi_C$ and $Q(\omega)=i\omega\Sigma$;

computing $Y=\Phi_C^T Z$, wherein the plurality of displacement vectors included in $\Phi Y$ indicate approximate measures of displacements in the structure; and communicating at least a portion of the plurality of displacement vectors included in $\Phi Y$ indicating approximate measures of displacements in the structure to a user interface.

9. The method of claim 8, further comprising:

approximately solving a fifth equation of the form $\{-\omega^2 M+i\omega B+[(1+i\gamma)K+iK_4]\}X=F$ by pre-multiplying the fifth equation by $\Phi^T$ and solving for a matrix Y, wherein the matrix X is approximately equal to $\Phi Y$, wherein the matrix $\Phi$ is a matrix satisfying the equations $K\Phi=M\Phi\Lambda$, $\Phi^T M\Phi=I_3$, a third identity matrix, and $\Phi^T K\Phi=\Lambda$, wherein the matrix $\Phi$ includes a plurality of columns, each column including an eigenvector that approximates one of a corresponding plurality of undamped natural modes of vibration associated with the structure, wherein $\Lambda$ is a diagonal matrix including a plurality of eigenvalues, each one of the plurality of eigenvalues corresponding to one of the eigenvectors or columns included in the matrix $\Phi$, and wherein the matrix Y includes a plurality of vectors corresponding to the plurality of load vectors included in the matrix F; and forming an approximation $X \approx \Phi Y$.

10. The method of claim 9, further comprising:
computing the matrix $\Phi$.

11. The method of claim 10, further comprising:
providing the matrices M, B, K, $K_4$, and F, and the scalar $\gamma$.

12. The method of claim 8, further comprising:
solving the fourth equation of the form $\{D(\omega)+PQ(\omega)R\}Z=\Phi_C^T \Phi^T F$ for Z directly.

13. The method of claim 8, further comprising:
solving the fourth equation of the form $\{D(\omega)+PQ(\omega)R\}Z=\Phi_C^T \Phi^T F$ for Z iteratively.

14. The method of claim 8, further comprising:
repeatedly solving for Z using each one of a selected set of excitation frequencies including the excitation frequency $\omega$.

15. A method of solving a first equation associated with a structure, the first equation being of the form $\{-\omega^2 I_1+i\omega(\Phi^T B\Phi)+[(1+i\gamma)\Lambda+i(\Phi^T K_4 \Phi)]\}Y=\Phi^T F$, wherein $\omega$ is a time-harmonic excitation frequency, wherein $I_1$ is an identity matrix which satisfies an equation of the form $\Phi^T M\Phi=I_1$, wherein M is a symmetric mass matrix, wherein $\Phi$ is a matrix having a plurality of columns, each column including an eigenvector that approximates one of a corresponding plurality of undamped natural modes of vibration associated with the structure, wherein B is a viscous damping matrix, wherein $\gamma$ is a scalar representing a global structural damping coefficient, wherein $\Lambda$ is a diagonal matrix which satisfies a second equation of the form $\Phi^T K\Phi=\Lambda$, wherein K is a symmetric stiffness matrix, wherein $K_4$ is a symmetric structural damping matrix representing local departures from the global structural damping coefficient $\gamma$, wherein Y is a matrix which satisfies a third equation of the form $X \approx \Phi Y$, and wherein X is a matrix having a plurality of displacement vectors corresponding to a plurality of load vectors acting on the structure included in the matrix F, the method comprising:

defining an intermediate matrix $C=(1+i\gamma)\Lambda+i(\Phi^T K_4 \Phi)$;

computing a plurality of eigenvalues and eigenvectors for a fourth equation $C\Phi_C=\Phi_C \Lambda_C$, wherein $\Phi_C$ is a matrix including eigenvectors of the matrix C, and wherein $\Lambda_C$ is a matrix including eigenvalues of the matrix C;

computing a matrix $P=\Phi_C^T U_R$, and a matrix $R=V_R^T \Phi_C$, wherein $U_R$ and $V_R$ are matrices which satisfy a singular value decomposition $\Phi^T B\Phi=U_R \Sigma_R V_R^T$, and wherein $\Sigma R$ is a diagonal matrix including singular values;

solving a fifth equation of the form $\{D(\omega)+PQ(\omega)R\}Z=\Phi_C^T \Phi^T F$ for Z, wherein $D(\omega)=-\omega^2 \Phi_C^T \Phi_C + \Phi_C^T C\Phi_C$ and $Q(\omega)=i\omega\Sigma_R$;

computing $Y=\Phi_C^T Z$, wherein the plurality of displacement vectors included in $\Phi Y$ indicate approximate measures of displacements in the structure; and communicating at least a portion of the plurality of displacement vectors included in $\Phi Y$ indicating approximate measures of displacements in the structure to a user interface.

16. The method of claim 15, further comprising:

approximately solving a sixth equation of the form $\{-\omega^2 M+i\omega B+[(1+i\gamma)K+iK_4]\}X=F$ by pre-multiplying the sixth equation by $\Phi^T$ and solving for a matrix Y, wherein the matrix X is approximately equal to $\Phi Y$, wherein the matrix $\Phi$ is a matrix satisfying the equations $K\Phi=M\Phi\Lambda$, $\Phi^T M\Phi=I_3$, a third identity matrix, and $\Phi^T K\Phi=\Lambda$, wherein the matrix $\Phi$ includes a plurality of columns, each column including an eigenvector that approximates one of a corresponding plurality of natural modes of vibration associated with the structure, wherein $\Lambda$ is a diagonal matrix including a plurality of eigenvalues, each one of the plurality of eigenvalues corresponding to one of the eigenvectors or columns included in the matrix $\Phi$, and wherein the matrix Y is a matrix having a plurality of vectors corresponding to the plurality of load vectors included in the matrix F; and forming an approximation $X \approx \Phi Y$.

17. The method of claim 16, further comprising:
computing the matrix $\Phi$.

18. The method of claim 17, further comprising:
providing the matrices M, B, K, $K_4$, and F, and the scalar $\gamma$.

19. The method of claim 15, further comprising:
solving the fifth equation of the form $\{D(\omega)+PQ(\omega)R\}Z=\Phi_C^T \Phi^T F$ for Z directly.

20. The method of claim 15, further comprising:
solving the fifth equation of the form $\{D(\omega)+PQ(\omega)R\}Z=\Phi_C^T \Phi^T F$ for Z iteratively.

21. The method of claim 15, further comprising:
repeatedly solving for Z using each one of a selected set of excitation frequencies including the excitation frequency $\omega$.

22. A method of solving a first equation associated with a structure, wherein the first equation is of the form $\{-\omega^2 I_1+i\omega(\Phi^T B\Phi)+[(1+i\gamma)\Lambda+i(\Phi^T K^4 \Phi)]\}Y=\Phi^T F$, wherein $\omega$ is a time-harmonic excitation frequency, wherein $I_1$ is an identity matrix which satisfies a second equation of the form $\Phi^T M\Phi=I_1$, wherein M is a symmetric mass matrix, wherein $\Phi$ is a matrix having columns spanning a subspace used to approximate a plurality of undamped natural modes of vibration associated with the structure, wherein B is a viscous damping matrix, wherein $\gamma$ is a scalar representing a global structural damping coefficient, wherein $\Lambda$ is a matrix that satisfies a third equation of the form $\Phi^T K\Phi=\Lambda$, wherein K is a symmetric stiffness matrix, wherein $K_4$ is a symmetric structural damping matrix representing local departures from the global structural damping coefficient, wherein Y is a matrix from which an approximation in the form of a fourth equation $X \approx \Phi Y$ can be made, and wherein X is a matrix having a plurality of displacement vectors corresponding to a plurality of load vectors acting on the structure included in the matrix F, the method comprising:

computing a singular value decomposition for at least one of the matrices B and $K_4$, wherein $B=U_B\Sigma_B V_B^T$, and wherein $K_4=U_{K4}\Sigma_{K4}V_{K4}^T$;

generating a matrix $P=\Phi^T[U_B U_{K4}]$ and a matrix $R=(\Phi^T[V_B V_{K4}])^T$;

solving a fifth equation of the form $\{D(\omega)+PQ(\omega)R\}Y=\Phi^T F$ for Y, wherein $D(\omega)=-\omega^2 I+(1+i\gamma)\Lambda$ and $$Q(\omega) = \begin{bmatrix} i\omega\Sigma_B & 0 \\ 0 & i\Sigma_{K4} \end{bmatrix}.$$

wherein the plurality of displacement vectors included in $\Phi Y$ indicate approximate measures of displacements in the structure; and communicating at least a portion of the plurality of displacement vectors included in $\Phi Y$ indicating approximate measures of displacements in the structure to a user interface.

23. The method of claim 22, further comprising:
approximately solving a sixth equation of the form $\{-\omega^2 M+i\omega B+[(1+i\gamma)K+iK_4]\}X=F$ by pre-multiplying the sixth equation by $\Phi^T$ and solving for a matrix Y, wherein the matrix X is approximately equal to $\Phi Y$, wherein the matrix $\Phi$ is a matrix satisfying the equations $K\Phi=M\Phi\Lambda$, $\Phi^T M\Phi=I_2$, a second identity matrix, and $\Phi^T K\Phi=\Lambda$, wherein the matrix $\Phi$ includes a plurality of columns, each column including an eigenvector approximating one of a corresponding plurality of natural modes of vibration associated with the structure, wherein $\Lambda$ is a diagonal matrix including a plurality of eigenvalues, each one of the plurality of eigenvalues corresponding to one of the eigenvectors or columns included in the matrix $\Phi$, and wherein the matrix Y is a matrix having a plurality of vectors corresponding to the plurality of load vectors included in the matrix F; and forming an approximation $X \approx \Phi Y$.

24. The method of claim 23, further comprising:
computing the matrix $\Phi$.

25. The method of claim 24, further comprising:
providing the matrices M, B, K, $K_4$, and F, and the scalar $\gamma$.

26. The method of claim 22, further comprising:
solving the fifth equation of the form $\{D(\omega)+PQ(\omega)R\}Y=\Phi^T F$ for Y directly.

27. The method of claim 22, further comprising:
solving the fifth equation of the form $\{D(\omega)+PQ(\omega)R\}Y=\Phi^T F$ for Y iteratively.

28. The method of claim 22, further comprising:
repeatedly solving for Y using each one of a selected set of excitation frequencies including the excitation frequency $\omega$.

29. A method of solving a first equation associated with a structure, wherein the first equation is of the form $\{-\omega^2 I_1+i\omega(\Phi^T B\Phi)+[(1+i\gamma)\Lambda+i(\Phi^T K_4\Phi)]\}Y=\Phi^T F$, wherein $\omega$ is a time-harmonic excitation frequency, wherein $I_1$ is an identity matrix which satisfies an equation of the form $\Phi^T M\Phi=I_1$, wherein M is a symmetric mass matrix, wherein $\Phi$ is a matrix having columns spanning a subspace used to approximate a plurality of undamped natural modes of vibration associated with the structure, wherein B is a viscous damping matrix, wherein $\gamma$ is a scalar representing a global structural damping coefficient, wherein $\Lambda$ is a matrix which satisfies a second equation of the form $\Phi^T K\Phi=\Lambda$, wherein K is a symmetric stiffness matrix, wherein $K_4$ is a symmetric structural damping matrix representing local departures from the global structural damping coefficient, wherein Y is a matrix from which an approximation in the form of a third equation $X \approx \Phi Y$ can be made, and wherein X is a matrix having a plurality of displacement vectors corresponding to a plurality of load vectors acting on the structure included in the matrix F, the method comprising:

computing a singular value decomposition for at least one of the matrices $B_R=\Phi^T B\Phi$ and $K_{4R}=\Phi^T K_4\Phi$, wherein $B_R=U_{BR}\Sigma_{BR}V_{BR}^T$, and wherein $K_{4R}=U_{K4R}\Sigma_{K4R}V_{K4R}^T$;

forming a matrix $P=[U_{BR}U_{K4R}]$ and a matrix $R=[V_{BR}V_{K4R}]^T$;

solving a fourth equation of the form $\{D(\omega)+PQ(\omega)R\}Y=\Phi^T F$ for Y, wherein $D(\omega)=-\omega^2 I+(1+i\gamma)\Lambda$ and $$Q(\omega) = \begin{bmatrix} i\omega\Sigma_B & 0 \\ 0 & i\Sigma_{K4} \end{bmatrix}.$$

wherein the plurality of displacement vectors included in $\Phi Y$ indicate approximate measures of displacements in the structure; and communicating at least a portion of the plurality of displacement vectors included in $\Phi Y$ indicating approximate measures of displacements in the structure to a user interface.

30. The method of claim 29, further comprising:
approximately solving a fifth equation of the form $\{-\omega^2 M+i\omega B+[(1+i\gamma)K+iK_4]\}X=F$ by pre-multiplying the fifth equation by $\Phi^T$ and solving for a matrix Y, wherein the matrix X is approximately equal to $\Phi Y$, wherein the matrix $\Phi$ is a matrix satisfying the equations $K\Phi=M\Phi\Lambda$, $\Phi^T M\Phi=I_2$, a second identity matrix, and $\Phi^T K\Phi=\Lambda$, wherein the matrix $\Phi$ includes a plurality of columns, each column including an eigenvector that approximates one of a corresponding plurality of natural modes of vibration associated with the structure, wherein $\Lambda$ is a diagonal matrix including a plurality of eigenvalues, each one of the plurality of eigenvalues corresponding to one of the eigenvectors or columns included in the matrix $\Phi$, and wherein the matrix Y is a matrix having a plurality of vectors corresponding to the plurality of load vectors included in the matrix F; and forming an approximation $X \approx \Phi Y$.

31. The method of claim 30, further comprising:
computing the matrix $\Phi$.

32. The method of claim 31, further comprising:
providing the matrices M, B, K, $K_4$, and F, and the scalar $\gamma$.

33. The method of claim 29, further comprising:
solving the fourth equation of the form $\{D(\omega)+PQ(\omega)R\}Y=\Phi^T F$ for Y directly.

34. The method of claim 29, further comprising:
solving the fourth equation of the form $\{D(\omega)+PQ(\omega)R\}Y=\Phi^T F$ for Y iteratively.

35. The method of claim 29, further comprising:
repeatedly solving for Y using each one of a selected set of excitation frequencies including the excitation frequency $\omega$.

36. An article comprising a machine-accessible medium having associated data used to solve a first equation associated with a structure, the first equation being of the form $\{-\omega^2 M_R + i\omega B_R + [(1+i\gamma)K_R + i(K_{4R})]\}Y = F_R$, wherein $\omega$ is a time-harmonic excitation frequency, wherein $M_R$ is a reduced form of a symmetric mass matrix M, wherein $B_R$ is a reduced form of a viscous damping matrix B, wherein $\gamma$ is a scalar global structural damping coefficient, wherein $K_R$ is a reduced form of a symmetric stiffness matrix K, wherein $K_{4R}$ is a reduced form of a symmetric structural damping matrix $K_4$ representing local departures from $\gamma$, wherein $F_R$ is a reduced form of a matrix F including a plurality of load vectors acting on the structure, and wherein the data, when accessed, results in a machine performing:
factoring the reduced matrix $M_R = L_M L_M^T$, wherein $L_M$ is a lower triangular matrix;
defining an intermediate matrix $C=(1+i\gamma)L_M^{-1}K_R L_M^{-T} + iL_M^{-1}K_{4R}L_M^{-T}$;
computing a plurality of eigenvalues and eigenvectors for a second equation $C\Phi_C = \Phi_C \Lambda_C$, wherein $\Phi_C$ is a matrix including eigenvectors of the matrix C, and wherein $\Lambda_C$ is a matrix including eigenvalues of the matrix C;
computing a matrix $P = \Phi_C^T L_M^{-1} U_R$ and a matrix $R = V_R^T L_M^{-T}\Phi_C$, wherein $U_R$ and $V_R$ are matrices which satisfy a singular value decomposition $B_R = U_R \Sigma_R V_R^T$, and wherein $\Sigma_R$ is diagonal, conformal with $U_R$ and $V_R$, and includes singular values;
solving a third equation of the form $(D(\omega)+PQ(\omega)R)Z = \Phi_C^T L_M^{-1} F_R$ for Z, wherein $D(\omega) = -\omega^2 I + \Lambda_C$ and $Q(\omega) = i\omega\Sigma_R$;
forming a product $Y = L_M^{-T}\Phi_C Z$, wherein a matrix $\Phi$ comprises eigenvectors satisfying the eigenvalue problem $K\Phi = M\Phi\Lambda$, wherein $\Lambda = \Phi^T K\Phi$, and wherein the matrix $\Phi$ multiplied by the product Y is approximately equal to a matrix X including a plurality of displacements of the structure; and
communicating at least a portion of the plurality of displacement vectors included in the matrix X indicating approximate measures of displacements in the structure to a user interface.

37. An apparatus to solve a first equation associated with a structure, the first equation being of the form $\{-\omega^2 M_R + i\omega B_R + [(1+i\gamma)K_R + i(K_{4R})]\}Y = F_R$, wherein $\omega$ is a time-harmonic excitation frequency, wherein $M_R$ is a reduced form of a symmetric mass matrix M, wherein $B_R$ is a reduced form of a viscous damping matrix B, wherein $\gamma$ is a scalar global structural damping coefficient, wherein $K_R$ is a reduced form of a symmetric stiffness matrix K, wherein $K_{4R}$ is a reduced form of a symmetric structural damping matrix $K_4$ representing local departures from $\gamma$, and wherein $F_R$ is a reduced form of a matrix F including a plurality of load vectors acting on the structure, comprising:
a factoring module to factor the reduced matrix $M_R = L_M L_M^T$, wherein $L_M$ is a lower triangular;
a definition module capable of being communicatively coupled to the factoring module, the definition module to define an intermediate matrix $C=(1+i\gamma)L_M^{-1}K_R L_M^{-T} + iL_M^{-T}K_{4R}L_M^{-T}$;
a first computation module capable of being communicatively coupled to the definition module, the first computation module to compute a plurality of eigenvalues and eigenvectors for a second equation $C\Phi_C = \Phi_C \Lambda_C$, wherein $\Phi_C$ is a matrix including eigenvectors of the matrix C, and wherein $\Lambda_C$ is a matrix including eigenvalues of the matrix C;
a second computation module capable of being communicatively coupled to the first computation module, the second computation module to compute a matrix $P = \Phi_C^T L_M^{-1} U_R$ and a matrix $R = V_R^T L_M^{-T}\Phi_C$, wherein $U_R$ and $V_R$ are matrices which satisfy a singular value decomposition $B_R = U_R \Sigma_R V_R^T$, and wherein $\Sigma_R$ is diagonal, conformal with $U_R$ and $V_R$, and includes singular values;
an equation solving module capable of being communicatively coupled to the second computation module, the equation solving module to solve a third equation of the form $(D(\omega)+PQ(\omega)R)Z = \Phi_C^T L_M^{-1} F_R$ for Z, wherein $D(\omega) = -\omega^2 I + \Lambda_C$ and $Q(\omega) = i\omega\Sigma_R$;
a product formation module to form a product $Y = L_M^{-T}\Phi_C Z$, wherein a matrix $\Phi$ comprises eigenvectors satisfying the eigenvalue problem $K\Phi = M\Phi\Lambda$, wherein $\Lambda = \Phi^T K\Phi$, and wherein the matrix $\Phi$ multiplied by the product Y is approximately equal to a matrix X including a plurality of displacements of the structure; and
a user interface to receive an approximation of a vibration-induced displacement of the structure including at least a portion of a product comprising the matrix $\Phi$ multiplied by the product Y.

38. A system to solve a first equation associated with a structure, the first equation being of the form $\{-\omega^2 M_R + i\omega B_R + [(1+i\gamma)K_R + i(K_{4R})]\}Y = F_R$, wherein $\omega$ is a time-harmonic excitation frequency, wherein $M_R$ is a reduced form of a symmetric mass matrix M, wherein $B_R$ is a reduced form of a viscous damping matrix B, wherein $\gamma$ is a scalar global structural damping coefficient, wherein $K_R$ is a reduced form of a symmetric stiffness matrix K, wherein $K_{4R}$ is a reduced form of a symmetric structural damping matrix $K_4$ representing local departures from $\gamma$, and wherein $F_R$ is a reduced form of a matrix F including a plurality of load vectors acting on the structure, comprising:
a processor;
a memory capable of being communicatively coupled to the processor, the memory including a factoring module to factor the reduced matrix $M_R = L_M L_M^T$, wherein $L_M$ is a lower triangular matrix; a definition module capable of being communicatively coupled to the factoring module, the definition module to define an intermediate matrix $C=(1+i\gamma)L_M^{-1}K_R L_M^{-T} + iL_M^{-1}K_{4R}L_M^{-T}$; a first computation module capable of being communicatively coupled to the definition module, the first computation module to compute a plurality of eigenvalues and eigenvectors for a second equation $C\Phi_C = \Phi_C \Lambda_C$, wherein $\Phi_C$ is a matrix including eigenvectors of the matrix C, and wherein $\Lambda_C$ is a matrix including eigenvalues of the matrix C; a second computation module capable of being communicatively coupled to the first computation module, the second computation module to compute a matrix $P = \Phi_C^T L_M^{-1} U_R$ and a matrix $R = V_R^T L_M^{-T}\Phi_C$, wherein $U_R$ and $V_R$ are matrices which satisfy a singular value decomposition $B_R = U_R \Sigma_R V_R^T$, and wherein $\Sigma_R$ is diagonal, conformal with $U_R$ and $V_R$, and includes singular values;
an equation solving module capable of being communicatively coupled to the second computation module, the equation solving module to solve a third equation of the form $(D(\omega)+PQ(\omega)R)Z=\Phi_C^T L_M^{-1} F_R$ for Z, wherein $D(\omega)=-\omega^2 I+\Lambda_C$ and $Q(\omega)=i\omega\Sigma_R$; and a product formation module to form a product $Y=L_M^{-T}\Phi_C Z$, wherein a matrix $\Phi$ comprises eigenvectors satisfying the eigenvalue problem $K\Phi=M\Phi\Lambda$, wherein $\Lambda=\Phi^T K\Phi$, and wherein the matrix $\Phi$ multiplied by the product Y is approximately equal to a matrix X including a plurality of displacements of the structure; and a user interface to couple to the memory and to receive an approximation of a vibration-induced displacement of the structure including at least a portion of a product comprising the matrix $\Phi$ multiplied by the product Y.

39. A method of solving a first equation associated with a structure, the first equation being of the form $\{-\omega^2 M_R + i\omega B_R + [(1+i\gamma)K_R + i(K_{4R})]\}Y = F_R$, wherein $\omega$ is a time-harmonic excitation frequency, wherein $M_R$ is a reduced form of a symmetric mass matrix M, wherein $B_R$ is a reduced form of a viscous damping matrix B, wherein $\gamma$ is a scalar global structural damping coefficient, wherein $K_R$ is a reduced form of a symmetric stiffness matrix K, wherein $K_{4R}$ is a reduced form of a symmetric structural damping matrix $K_4$ representing local departures from $\gamma$, and wherein $F_R$ is a reduced form of a matrix F including a plurality of load vectors acting on the structure, the method comprising:

solving an eigenvalue problem of the form $[(1+i\gamma)K_R + iK_{4R}]\Phi_G = M_R\Phi_G\Lambda_G$;

computing a matrix $P=\Phi_G^T U_R$ and a matrix $R=V_R^T\Phi_G$, wherein $U_R$ and $V_R$ are matrices which satisfy a singular value decomposition $B_R = U_R\Sigma_R V_R^T$, and wherein $\Sigma_R$ is diagonal, conformal with $U_R$ and $V_R$, and includes singular values;

solving a third equation of the form $(D(\omega)+PQ(\omega)R)Z=\Phi_G^T F_R$ for Z, wherein $D(\omega)=-\omega^2 I+\Lambda_G$ and $Q(\omega)=i\omega\Sigma_R$, wherein $\Phi_G$ is normalized to satisfy $\Phi_G^T M_R\Phi_G=I$, where I is an identity matrix and $\Phi_G^T K_R\Phi_G=\Lambda_G$;

forming a product $Y=L_M^{-T}\Phi_G Z$, wherein a matrix $\Phi$ comprises eigenvectors satisfying the eigenvalue problem $K\Phi=M\Phi\Lambda$, wherein $\Lambda=\Phi^T K\Phi$, and wherein the matrix $\Phi$ multiplied by the product Y is approximately equal to a matrix X including a plurality of displacements of the structure; and communicating an approximation of a vibration-induced displacement of the structure, including at least a portion of a product comprising the matrix $\Phi$ multiplied by the product Y, to a user interface.

40. A method of solving a first equation associated with a structure, the first equation being of the form $\{-\omega^2 M + i\omega B + [(1+i\gamma)K + i(K_4)]\}X = F$, wherein X is a matrix of displacement vectors, wherein $\omega$ is a time-harmonic excitation frequency, wherein M is a symmetric mass matrix, wherein B is a viscous damping matrix, wherein $\gamma$ is a scalar global structural damping coefficient, wherein K is a symmetric stiffness matrix, wherein $K_4$ is a symmetric structural damping matrix representing local departures from $\gamma$, and wherein F is a matrix including a plurality of load vectors acting on the structure, the method comprising:

transforming at least two matrices included in a set of matrices comprising M, B, K, $K_4$ to provide a set of at least two diagonalized matrices and a set of non-diagonalized matrices, wherein $K_4$ is non-null;

forming a matrix D comprising a linear combination of the set of at least two diagonalized matrices;

forming a matrix product PQR as a representation of a linear combination of the set of non-diagonalized matrices;

solving a second equation of the form $(D+PQR)Z=A$ for Z, wherein Z is a frequency response solution matrix, and wherein A is a transformed load matrix;

back-transforming the frequency response solution matrix Z to provide the matrix X including the displacement vectors indicating measures of displacements in the structure; and communicating at least a portion of the displacement vectors included in the matrix X indicating measures of displacements in the structure to a user interface.

41. The method of claim 40, wherein the matrices P and R are rectangular, and wherein the matrix Q is square.

42. A method of solving a first equation associated with a structure, the first equation being of the form $\{-\omega^2 M + i\omega B + [(1+i\gamma)K + i(K_4)]\}X = F$, wherein X is a matrix of displacement vectors, wherein $\omega$ is a time-harmonic excitation frequency, wherein M is a symmetric mass matrix, wherein B is a viscous damping matrix, wherein $\gamma$ is a scalar global structural damping coefficient, wherein K is a symmetric stiffness matrix, wherein $K_4$ is a symmetric structural damping matrix representing local departures from $\gamma$, and wherein F is a matrix including a plurality of load vectors acting on the structure, the method comprising:

forming a matrix D comprising a linear combination of a set of at least two diagonal matrices selected from the set of matrices M, B, K, $K_4$, wherein at least two of the matrices M, B, K, $K_4$ are diagonal, and wherein at least one of the matrices B and $K_4$ is non-null;

forming a matrix product PQR as a representation of a linear combination of a set of non-diagonal matrices selected from the set of matrices M, B, K, $K_4$;

solving a second equation of the form $(D+PQR)X=F$ for the matrix X including the displacement vectors indicating measures of displacements in the structure; and communicating at least a portion of the matrix X including the displacement vectors indicating measures of displacements in the structure to a user interface.

43. The method of claim 42, wherein the matrices P and R are rectangular, and wherein the matrix Q is square.

44. A method of approximating a solution of a first equation associated with a structure, the first equation being of the form $\{-\omega^2 M + i\omega B + [(1+i\gamma)K + i(K_4)]\}X = F$, wherein X is a matrix of displacement vectors, wherein $\omega$ is a time-harmonic excitation frequency, wherein M is a symmetric mass matrix, wherein B is a viscous damping matrix, wherein $\gamma$ is a scalar global structural damping coefficient, wherein K is a symmetric stiffness matrix, wherein $K_4$ is a symmetric structural damping matrix representing local departures from $\gamma$, and wherein F is a matrix including a plurality of load vectors acting on the structure, the method comprising:

obtaining reduced forms of the matrices M, B, K, $K_4$, and F as $M_R=\Phi^T M\Phi$, $B_R=\Phi^T B\Phi$, $K_R=\Phi^T K\Phi$, $K_{4R}=\Phi^T K_4\Phi$, and $F_R=\Phi^T F\Phi$, respectively, wherein $\Phi$ is a matrix having columns spanning a subspace of approximation for approximating the solution matrix X, and wherein at least one of the matrices B and $K_4$ is non-null;

forming a matrix D comprising a linear combination of a set of at least two diagonalized matrices selected from a set of matrices obtained from transforming the reduced matrices $M_R$, $B_R$, $K_R$, and $K_{4R}$;

forming a matrix product PQR as a representation of a linear combination of the set of non-diagonalized matrices selected from a set of matrices obtained from transforming the reduced matrices $M_R$, $B_R$, $K_R$, and $K_{4R}$;

solving a second equation of the form $(D+PQR)Z=A$ for Z, wherein Z is a frequency response solution matrix, and wherein A is a transformed load matrix;

back-transforming the frequency response solution matrix Z to provide a back-transformed matrix Z and multiplying the back-transformed matrix Z by $\Phi$ to provide an approximation of the solution matrix X, wherein the approximation includes a plurality of displacement vectors indicating approximate measures of displacements in the structure; and communicating at least a portion of the approximation indicating approximate measures of displacements in the structure to a user interface.

45. The method of claim 44, wherein the matrices P and R are rectangular, and wherein the matrix Q is square.

46. A method of approximating a solution of a first equation associated with a structure, the first equation being of the form $\{-\omega^2 M+i\omega B+[(1+i\gamma)K+i(K_4)]\}X=F$, wherein X is a matrix of displacement vectors, wherein $\omega$ is a time-harmonic excitation frequency, wherein M is a symmetric mass matrix, wherein B is a viscous damping matrix, wherein $\gamma$ is a scalar global structural damping coefficient, wherein K is a symmetric stiffness matrix, wherein $K_4$ is a symmetric structural damping matrix representing local departures from $\gamma$, and wherein F is a matrix including a plurality of load vectors acting on the structure, the method comprising:

obtaining reduced forms of the matrices M, B, K, $K_4$, and F as $M_R=\Phi^T M\Phi$, $B_R=\Phi^T B\Phi$, $K_R=\Phi^T K\Phi$, $K_{4R}=\Phi^T K_4 \Phi$, and $F_R=\Phi^T F\Phi$, respectively, wherein $\Phi$ is a matrix having columns spanning a subspace of approximation for approximating the solution matrix X, wherein at least one of the matrices B and $K_4$ is non-null, and wherein at least two of the matrices selected from a set of reduced matrices including $M_R$, $B_R$, $K_R$, and $K_{4R}$ are diagonal;

forming a matrix D comprising a linear combination of the at least two diagonal matrices selected from the set of reduced matrices including the matrices $M_R$, $B_R$, $K_R$, and $K_{4R}$;

forming a matrix product PQR as a representation of a linear combination of the set of non-diagonal matrices selected from a set of reduced matrices including the matrices $M_R$, $B_R$, $K_R$, and $K_{4R}$;

solving a second equation of the form $(D+PQR)Z=F_R$ for Z, wherein Z is a frequency response solution matrix;

multiplying the matrix Z by the matrix $\Phi$ to provide an approximation of the solution matrix X, wherein the approximation includes a plurality of displacement vectors indicating approximate measures of displacements in the structure; and communicating at least a portion of the approximation indicating approximate measures of displacements in the structure to a user interface.

47. The method of claim 46, wherein the matrices P and R are rectangular, and wherein the matrix Q is square.

* * * * *